March 27, 1928.
D. K. MACLEOD
1,664,178
FORMING MACHINE FOR PLASTIC MATERIALS
Original Filed Feb. 12, 1925
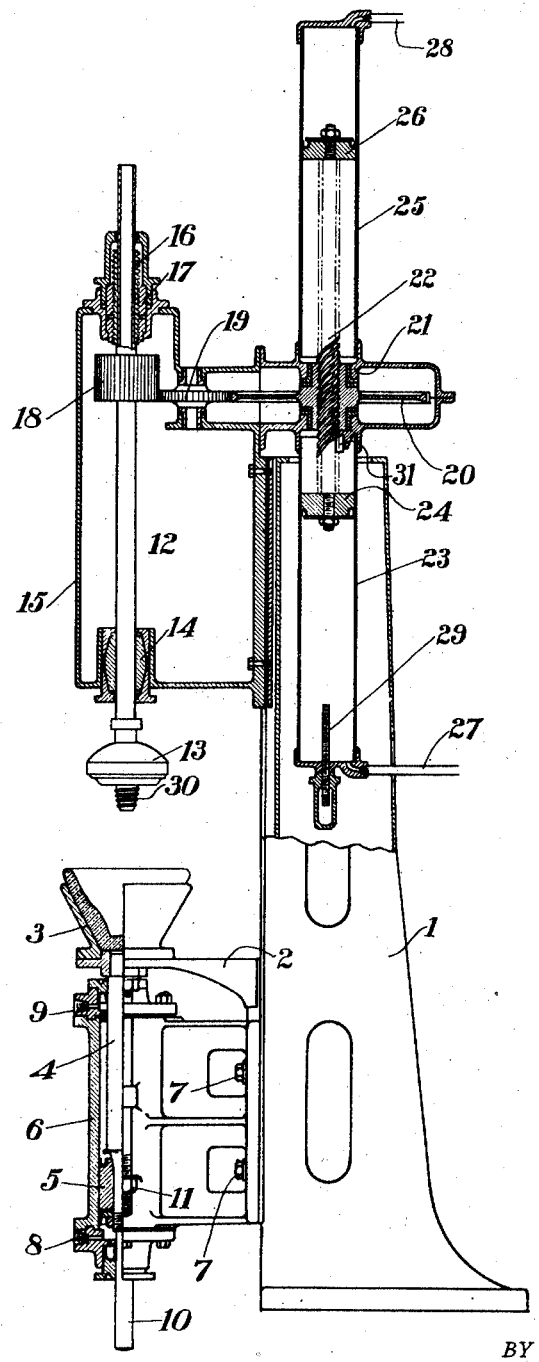
INVENTOR
BY Donald Keith Macleod
Nissen & Crane
ATTORNEYS Patented Mar. 27, 1928.

1,664,178

UNITED STATES PATENT OFFICE.

DONALD KEITH MACLEOD, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

FORMING MACHINE FOR PLASTIC MATERIALS.

Application filed February 12, 1925, Serial No. 8,721. Renewed November 24, 1926.

This invention relates to machines commonly known as center machines for forming recesses in articles made of plastic material and has for its object the provision of machines of the class named in which the forming dies will be positively and accurately operated and in which the actuating mechanism for said dies shall be of improved construction and operation.

The invention is exemplified in the combination and arrangement of parts shown in the accompanied drawing and described in the following specification and it is more particularly pointed out in the appended claims.

In the drawing—

The figure is an elevation with parts in section of a machine having one embodiment of the present invention applied thereto.

The numeral 1 designates a supporting frame or column having a bracket 2 mounted thereon for supporting a receptacle or pot 3 into which the plastic material is placed for forming the articles of ware manufactured by the machine. The pot 3 is carried by a piston rod 4, having a piston 5 arranged to travel in a cylinder 6, the cylinder being secured by screws 7 to the frame 1. Actuating fluid for the piston 5 is admitted through openings 8 and 9 at the opposite ends of the cylinder 6. The piston rod 4 may be continued below the cylinder 6 as shown at 10 at its lower end. The spindle 12 is journaled to rotate and slide in a bearing 14 formed in the lower wall of the housing 15 which is supported on the frame 1. The bearing 14 constitutes a stuffing box for retaining lubricating material within the housing 15. The upper end of the spindle 12 is provided with a sleeve 16 shrunk or otherwise secured thereto, the sleeve having external threads thereon which mesh with a nut 17 supported in the upper end of the housing 15. A gear 18 is secured to the spindle 12 within the housing 15 and is provided with elongated teeth which mesh with the teeth of a pinion 19 journaled in the housing 15. The pinion 19 meshes with a gear 20 journaled to rotate in a bearing block 21 carried at the upper end of the frame 1. The gear 20 is centrally bored and threaded to receive a piston rod 22 having external threads to mesh with the internal threads of the gear 20. These threads are of sufficiently coarse pitch so that longitudinal movement of the piston rod 22 will impart rotation to the gear 20. The piston rod 22 is held against rotation in the bearing block 21 by means of a key 31 which engages a keyway in the piston rod 22. A cylinder 23 is secured to the lower face of the bearing block 21 and is disposed within the frame 1. The lower end of the piston rod 22 is provided with a piston 24 arranged to travel within the cylinder 23. A second cylinder 25 is mounted on the upper face of the bearing block 21 and the upper end of the piston rod 22 is provided with a piston 26 arranged to travel within the cylinder 25. Fluid under pressure may be admitted through pipe 27 to the lower end of the cylinder 23 and a similar pipe 28 is provided for admitting pressure fluid to the upper end of the cylinder 25. The upper end of the cylinder 23 and the lower end of the cylinder 25 are open to atmosphere. Suitable valve mechanism is provided for controlling the admission of pressure fluid to the cylinders to move the pistons 24 and 26 upwardly and downwardly. An adjustable stop 29 is provided for limiting the downward movement of the cylinders. In operation a suitable mould is placed in the supporting pot 3 and the requisite amount of clay for forming a piece of ware is placed in the mould. The pot 3 is then raised by the piston 5 to the upper extremity of its movement where it will be sustained by the pressure of the fluid in the cylinder 6 during the operation of forming the clay into the proper shape. With the pot in its upper position, the pressure fluid is admitted to the upper end of the cylinder 25 which will force the pistons 24 and 26 and the piston rod 22 downwardly. This will impart rotation to the gear wheel 20 and through the connected gearing to the spindle 12. Since the spindle 12 is threaded in the fixed nut 17, the rotation of the spindle will cause the die 13 to be carried downwardly and at the same time rotated. The threads 30 on the die 13 have the same pitch as the threads on the sleeve 16. This causes the die to be fed downwardly at the correct rate of speed to form threads in the plastic material within the mould. Since the gear 18 has elongated teeth, the longitudinal movement of the spindle 12 will not break the connection between the gear 18 and its driving gear 19. The stop 29 is adjusted to arrest the movement of the piston rod 22 at the point where the die 13 has reached the correct position in the plastic material on the support 3. The pipe 28 can then be connected with the exhaust and pressure fluid admitted to the pipe 27. This will impart reversed rotation to the spindle 12 and unscrew the threads 30 so that the die 13 will be retracted from the plastic material without injury to the threads formed by the die. The positive stop 29 insures arrest of the spindle 12 at the same position for each operation of the machine and thus, provides uniformity in the articles produced. The valves controlling the pipes 27 and 28 may be operated to arrest the spindle at the upper end of its movement to permit the removal of the completed piece and the insertion of a new mould with a fresh batch of clay for the next piece. The exact position of arrest at the upper end of the travel of the piston 12 is not so important but the extreme downward limit of the travel of the die is of greater importance to insure accurate formation and uniformity of the pieces of ware.

I claim—

1. A forming machine for plastic material comprising a movable die, a fluid pressure device for moving said die and a stop arranged to act on said fluid-pressure device for arresting said fluid pressure device to arrest the movement of said die at a predetermined position.

2. In a machine for forming plastic material, the combination with a pair of forming members of fluid pressure means for rotating one of said forming members and simultaneously causing said members to approach each other, and a stop arranged to act on said fluid-pressure means for limiting the operation of said fluid pressure means when said forming members have reached a predetermined position relative to each other.

3. In combination a support for plastic material, a die having threads thereon for engaging the material in said support, a spindle carrying said die, threaded means for advancing said spindle and die toward said support when said spindle is rotating, a gear for rotating said spindle, a reciprocating rod having threads thereon of coarse pitch engaging said gear to rotate said gear when said rod is moving longitudinally, fluid pressure operating means for moving said rod and a stop arranged to act on said fluid pressure operating means for limiting the movement of said rod in one direction.

4. A machine for forming plastic material comprising a support for the material, means for raising and lowering said support, a plunger disposed in registration to said support, threaded means for advancing said plunger toward said support when said plunger is rotated, a gear for rotating said plunger, a threaded rod for rotating said gear when said rod is moving longitudinally, a cylinder disposed in said frame, a piston secured to said rod and movable in said cylinder and a stop for limiting the movement of said piston in one direction and a cooperating contact member movable in unison with said piston and arranged to engage said stop.

5. In combination a supporting frame, a bearing block mounted on said frame, a cylinder secured to said block and extending downwardly into said frame, a gear journaled in said bearing block, a shaft threaded through said gear and having a piston thereon arranged to move in said cylinder, a thread forming plunger and gearing for rotating said thread forming plunger from said gear when said piston is moved in said cylinder.

6. A machine for forming plastic material comprising a supporting frame, a receptacle on said frame for supporting plastic material, a longitudinally movable plunger having a die for engaging the material in said receptacle, a spindle for actuating said die, threaded means for advancing said die when said spindle is rotated, a gear for driving said spindle and an elongated gear secured to said spindle and meshing with said first named gear to maintain driving connection for the various positions of longitudinal movement of said spindle.

7. A machine for forming plastic material comprising a supporting frame, a receptacle for holding plastic material mounted on said frame, means for raising and lowering said receptacle, a plunger having a die thereon for engaging material in said receptacle, a spindle for actuating said die, threaded means for advancing said die when said spindle is rotated, a gear for rotating said spindle, a rod having threaded connection with said gear to cause rotation thereof when said rod is moving longitudinally, pistons on opposite ends of said rod, a pair of cylinders in which said pistons move, means for supplying fluid pressure to said cylinders to actuate said pistons and means for limiting the movement of said pistons in one direction to determine the limit of movement of said die toward said receptacle.

In testimony whereof I have signed my name to this specification on this 30th day of January A. D. 1925.

DONALD KEITH MACLEOD.